Aug. 20, 1929.　　　J. B. WANTZ　　　1,725,030

X-RAY APPARATUS

Filed March 22, 1922　　　4 Sheets-Sheet 1

Fig. 1.

Inventor,
Julius B. Wantz,
By *[signature]*
Attys.

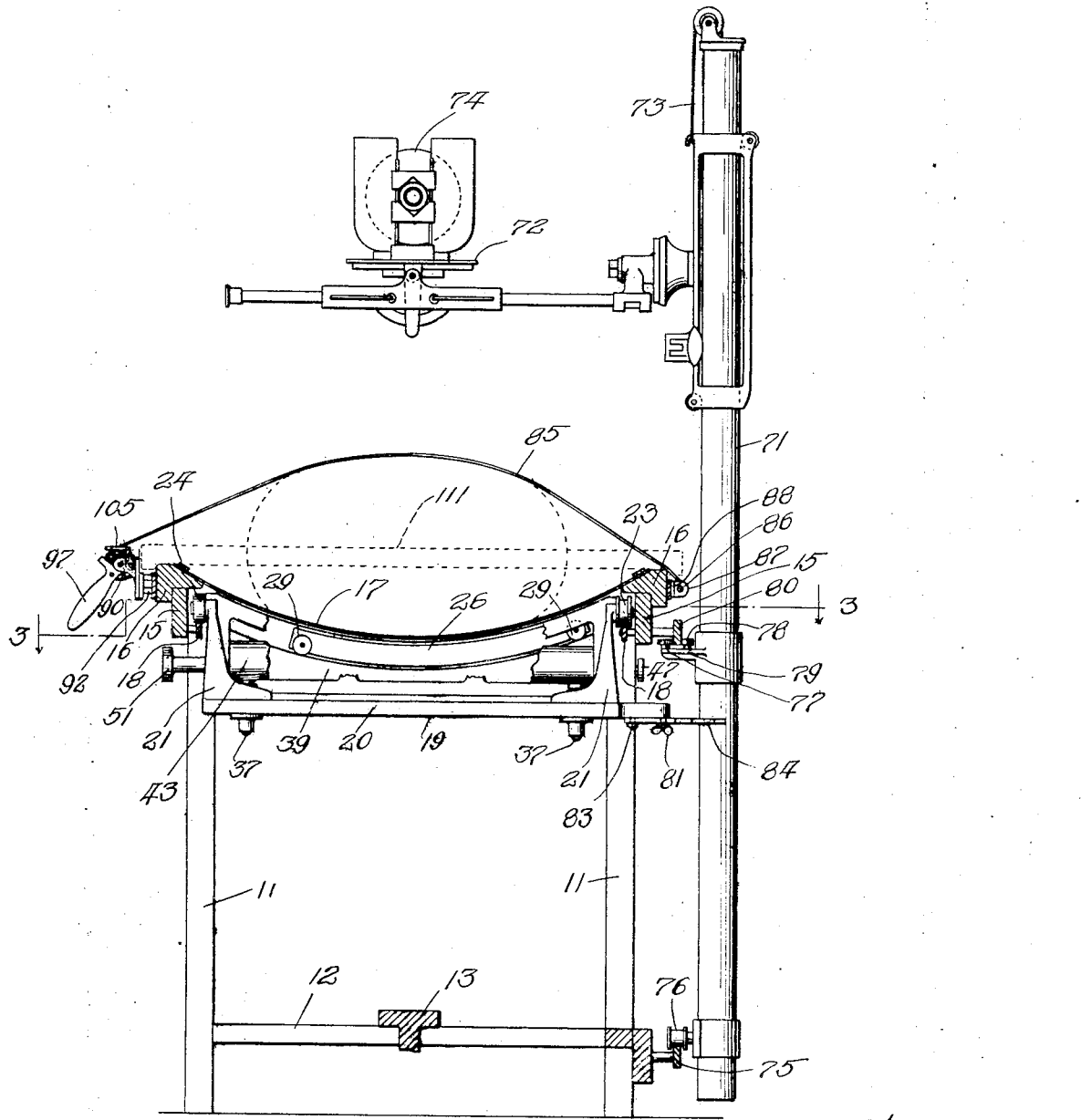

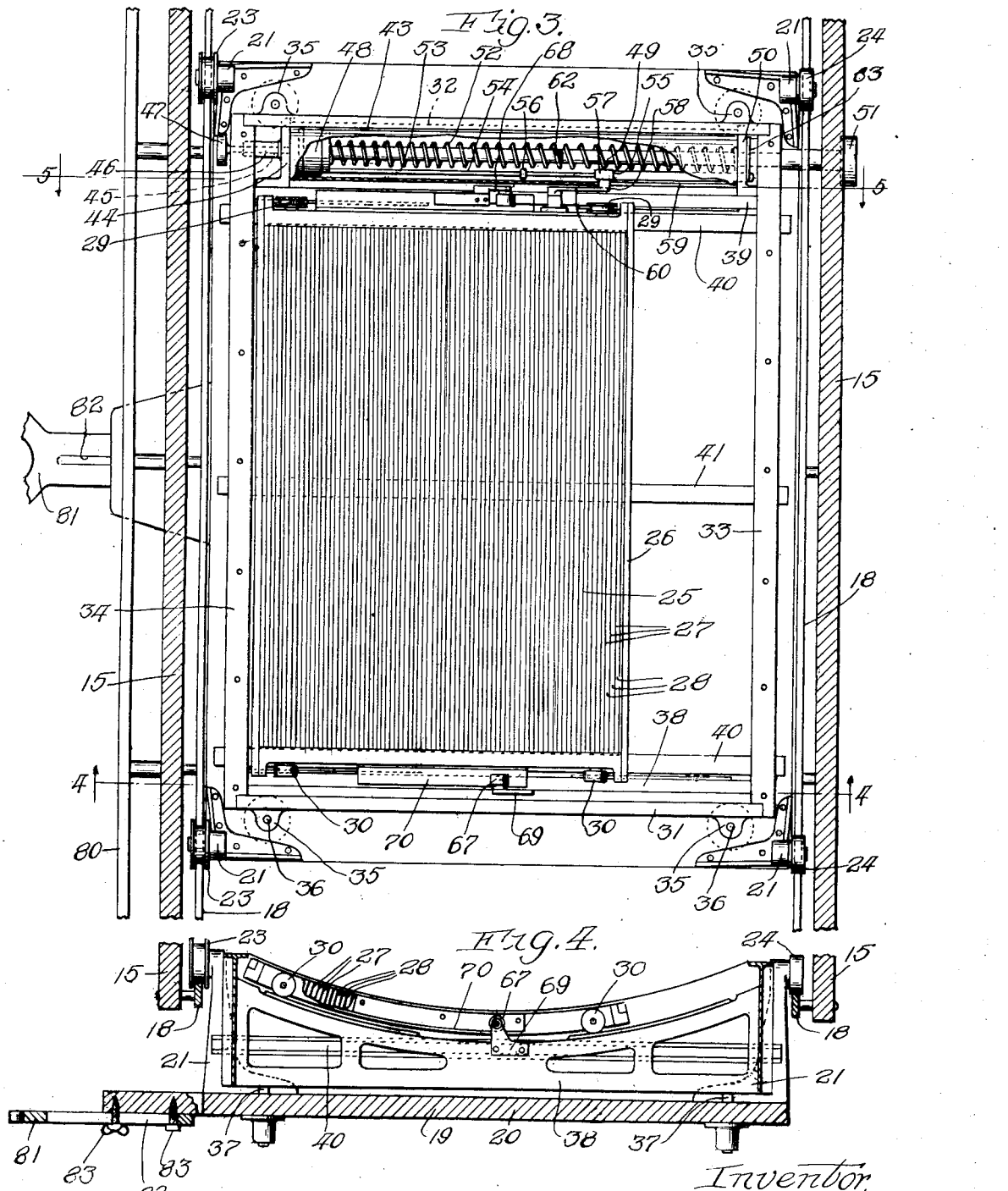

Aug. 20, 1929.                    J. B. WANTZ                    1,725,030
                                X-RAY APPARATUS
                             Filed March 22, 1922         4 Sheets-Sheet 4
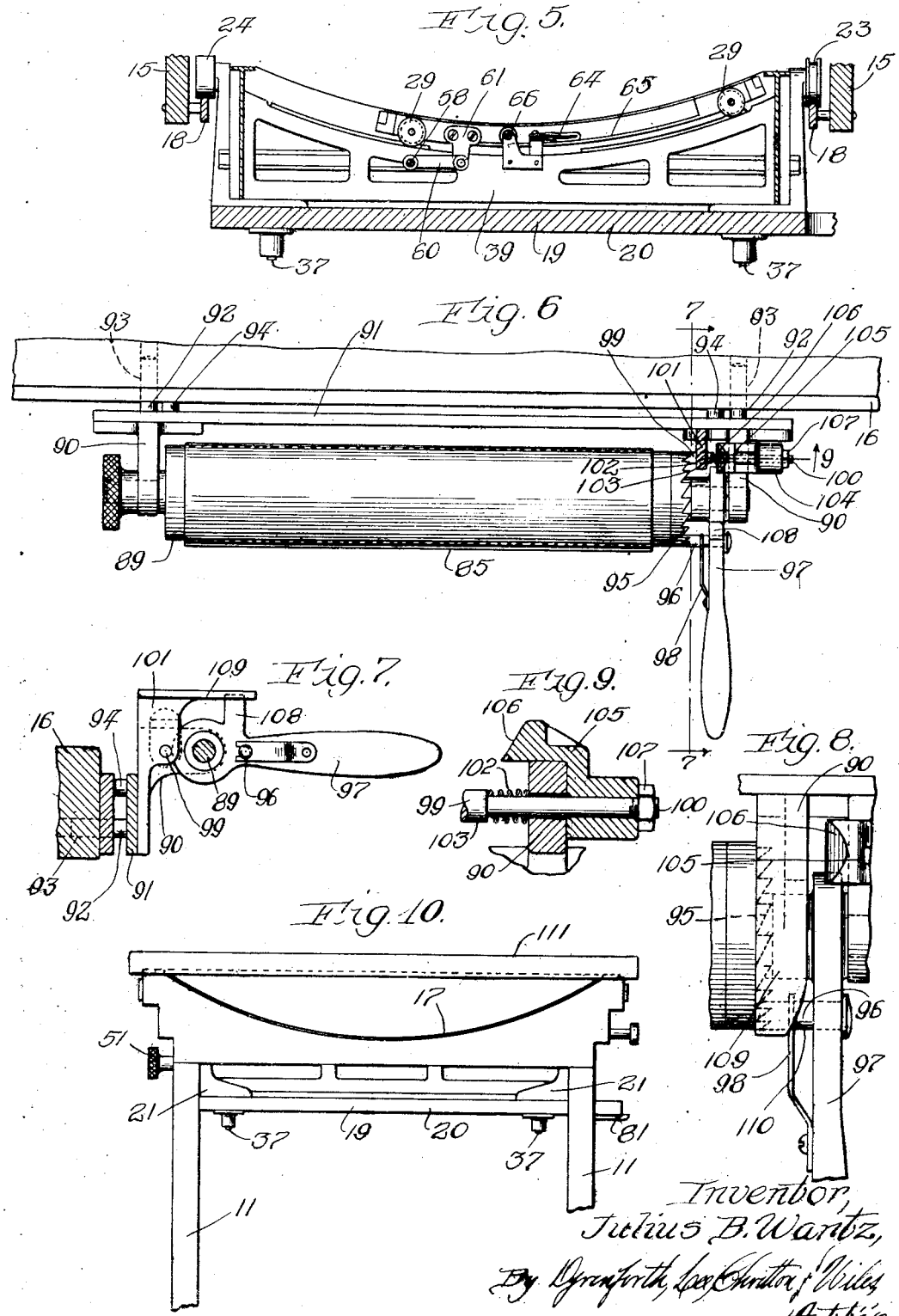
Inventor,
Julius B. Wantz, Patented Aug. 20, 1929.

1,725,030

UNITED STATES PATENT OFFICE.

JULIUS B. WANTZ, OF CHICAGO, ILLINOIS, ASSIGNOR TO VICTOR X-RAY CORPORATION, OF CHICAGO, ILLINOIS, A CORPORATION OF NEW YORK.

X-RAY APPARATUS.

Application filed March 22, 1922. Serial No. 545,662.

My invention, as to one phase thereof, relates to X-ray apparatus employing a so-called screen, or grid, known as the Bucky diaphragm, for use in intercepting, in their passage toward the sensitized plate from which the radiograph is made, the secondary and scattered X-rays which are radiated from the body into which the primary X-rays from the tube are directed, for the purpose of preventing the fogging of the plate, the Bucky grid or screen, referred to being of a type comprising partitions arranged in the form of a screen, or grid, the partitions being of a material opaque to X-rays, and so arranged that the primary X-rays from the X-ray tube employed may be permitted to pass through the spaces in the screen, or grid, and thence to the plate, as the case may be, the screen, or grid, referred to being commonly provided of concavo-convex form, with the partitions thereof radiating substantially from the focal spot of the X-ray tube and the screen, or grid, being movable in the arc of a circle described substantially from the focal spot of the tube, avoiding the showing of lines on the plate.

One of the objects of my invention is to provide in a structure of the character referred to, for the bodily adjustment of the grid, or screen, relative to the patient and in a direction lengthwise thereof in order that the screen, or grid, may be adjusted opposite different portions of the body of the patient. Another object in this connection is to provide in such an arrangement, for the adjustment of the X-ray tube, co-operating with the screen, or grid, in a direction lengthwise of the patient and preferably simultaneously with the screen or grid; and also to provide, by preference, for the simultaneous adjustment of the screen, or grid, and the X-ray tube, or the movement of the X-ray tube independently of the screen, or grid, in a direction lengthwise of the patient in performing work not requiring the use of the screen, or grid.

Another of the features of my invention relates to apparatus involving a compression and immobilizing device for use in compressing and maintaining against movement, portions of the body of the patient through which the X-rays are to be directed, it being my object in this connection to provide an arrangement whereby the device referred to may be bodily moved into different positions along the support for the patient, in order that the device may be caused to extend across different portions of the patient, as desired, it being a further object to provide a novel, simple and readily adjustable arrangement for the purpose stated. Another object of the invention is to provide a novel, simple and relatively inexpensive construction of apparatus involving the screen, or grid, feature above referred to and which may be readily converted from a condition in which the patient is supported in the proper position for using the screen, or grid, into a condition wherein radiographs, to be made without the use of the screen, or grid, may be made, and vice versa, the main purpose in this last-referred-to connection being to provide a single apparatus of relatively inexpensive construction by which radiographs, involving the use of the screen, or grid, may be made in a highly satisfactory manner, and, when desired, ordinary radiographs, viz, without using in connection with the taking of the latter a screen or grid, may be made.

Referring to the accompanying drawings: Figure 1 is a view in side elevation of an apparatus embodying my improvements, the upper end of the X-ray-tube-supporting means being broken away. Figure 2 is a section taken at the line 2—2 on Fig. 1 and viewed in the direction of the arrows, certain portions of the structure being broken away, and the compression and immobilizing device being shown in operative position, this view also showing by dotted lines a removable and replaceable, and substantially flat, table top portion which may be used, as for example in the taking of ordinary radiographs. Figure 3 is an enlarged sectional view, with certain parts broken away, of a portion of the apparatus shown in Fig. 2, the section being taken at the line 3—3 on Fig. 2 and viewed in the direction of the arrows. Figure 4 is a section taken at the line 4—4 on Fig. 3 and viewed in the direction of the arrows, certain parts being broken away. Figure 5 is a section taken at the line 5—5 on Fig. 3 and viewed in the direction of the arrow, certain of the parts being broken away. Figure 6 is a view in side elevation of a portion of the frame of the apparatus and a portion of the device above referred to, certain parts being shown in section. Figure 7 is a broken section taken at the line 7—7 on Fig. 6 and viewed in the direction of the arrows. Figure 8 is a plan view of a portion of the mechanism shown in Fig. 6. Figure 9 is a broken section taken at the line 9 on Fig. 6 and viewed in the direction of the arrow; and Figure 10, an end view of the apparatus of the preceding figures showing the removable and replaceable, substantially flat, table top portion hereinbefore referred to in position for supporting a patient for the taking of ordinary radiographs.

The apparatus, shown as in the form of a table structure, comprises, generally stated, legs 11 braced by the cross-pieces 12 at each end and a centrally-disposed longitudinally-extending member 13 connected with these cross-pieces, upper cross-pieces 14 connecting the legs 11, and side rail members 15 and 16 secured together in any desirable way and connected with the legs 11. Extending lengthwise of the frame structure referred to and of trough form, is a table top 17 extending preferably the entire length of the frame and preferably formed of relatively thin material, transparent to X-rays, a desirable material being aluminum, this table top, which is secured at its opposite edges to the rail 16, in any desirable manner, forming the support for the patient in the use of the screen, or grid, hereinafter described.

The rails 15 are shown as provided at their inner surfaces with tracks 18 which extend lengthwise of the table structure and are supported to extend in spaced relation from these rails as shown, these tracks being provided for cooperation with a carriage represented generally at 19, for supporting the latter and permitting it to be moved bodily lengthwise of the table structure to extend opposite any point along the table top 17 and a patient supported on the latter. The carriage 19 is shown as formed of a plate portion 20 from the corners of which rise brackets 21 secured to the plate portion in any suitable way, the brackets 21 at one side of the table being provided with grooved rollers 23 journaled thereon and extending at their grooved peripheries over the upper edge of the track 18 at this side of the table, the brackets 21 being provided at their upper ends with rollers 24 having plain peripheries at which they bear upon the upper surface of the track 18 adjacent thereto, the arrangement just referred to permitting the carriage 19 to be rolled along the table structure, below the table top 17, into any position desired. The carriage 20 is provided for supporting the screen, or grid, hereinbefore referred to, together with operating parts preferably employed for effecting movement of the screen, or grid, in the exposure of the patient to the X-rays from the tube hereinafter referred to, to avoid the making of lines on the plate.

The screen, or grid, referred to, is represented at 25, and may be of any desirable construction, that shown being formed of a border frame 26 within which are confined a series of strips fitting flatwise together, alternate ones of which are formed of material opaque to X-rays, such as, for example, lead, these strips being represented at 27, and the strips interposed therebetween and represented at 28 being formed of material transparent to X-rays, as for example wood, the strips 27 forming partitions which serve to intercept secondary X-rays emitted from a patient into which the X-rays from a tube are directed, and prevent these secondary rays from fogging the sensitized plate upon which the radiograph is to be made. The particular form of screen shown is concavo-convex and lies within an arc described from the center of the tube, hereinbefore referred to and supported as hereinafter stated. The frame 26 is provided at opposite ends with rollers 29 and 30, the rollers 29 being shown as peripherally grooved, at which the screen, or grid, device is supported, and movable, on parallel tracks.

The apparatus also involves a frame shown as formed of the marginal border members 31, 32, 33 and 34 of such shape and proportions as to adapt it to be applied to the plate portion 20 to extend within the confines of the brackets 21, the members 31 and 32 being formed with outwardly-projecting lugs 35 containing openings 36 adapted to receive the upper, reduced, ends of upwardly-extending studs 37 carried by the plate member 20. The frame last referred to and comprising the members 31 to 34 inclusive, also comprises cross-members 38 and 39 equipped with the tracks above referred to as engaging the rollers 29 and 30, the upper surfaces of these tracks being curved to extend concentrically with the screen, or grid, structure referred to and lying within an arc described from the center of the X-ray tube hereinbefore referred to.

It will be understood from the foregoing that the screen, or grid, structure is adapted for movement on the carriage 19 in a curved path cross wise of the table and is also adapted to be shifted into any desired position along the table by shifting the carriage 19 lengthwise of the table.

The carriage 19 is provided with means for supporting a sensitized plate upon which the radiograph is to be made, in a position below the screen, or grid, these means being shown as comprising a pair of grooved members 40 secured at their ends to the frame members 33 and 34, with their grooves opening toward each other and adapted to receive a plate-carrying holder represented at 42 introduced into position therein by movement crosswise of the table, the carriage being also preferably provided with a cross-member 41 located midway between the members 40 and upon which the plate-holder would rest.

Means are preferably provided for mechanically moving the screen, or grid, device along the tracks in a direction crosswise of the table, during the exposure of the plate beneath it, to X-rays. Any suitable means may be provided for this purpose, those shown comprising a cylinder 43 rigidly secured to the frame formed of the bars 31, 32, 33 and 34, in the space between the bar 32 and 39, to extend crosswise of the table, the head 44 forming one end of the cylinder containing a passage 45 opening into the interior of the latter and at 46 opening to the atmosphere, the passage 45 containing a needle valve 47 adjustable therein to control the opening 46. The cylinder 43 contains a piston 48 which is slidable therein and extends at its stem portion 49 through the head 50 at the opposite end of the cylinder, the outer end of this stem being provided with a knob represented at 51. A coiled spring 52 surrounds the stem 49 and is confined between the head 50 and the piston 48, this spring tending to move the piston to the position shown in Fig. 3. Located in the cylinder 43 and secured at one end to the piston 48 and slidably mounted at its opposite end in the head 50, is a rod 53, the left hand end of which, in Fig. 3, is of reduced diameter, as represented at 54, whereby a shoulder 55 is provided, the reduced portion 54 of this rod carrying a stop 56 spaced from the shoulder 55. Surrounding the reduced portion 54 of the rod 53, between the shoulder 55 and the stop 56, is a sleeve 57 relative to which the rod 53 is slidable, this sleeve being provided with a laterally-extending stud 58 which extends into a slot 59 in the side wall of the cylinder 43. Journaled on the stud 58 is a crank 60, the outer end of which is pivotally connected with a bracket 61 secured to one of the end bars of the screen, or grid, frame 26, whereby the screen, or grid, is operated from the piston 48.

It may be here stated that assuming the screen, or grid, to be in the position shown in Figs. 3, 4 and 5, to position the screen, or grid, preparatory to the operation of the latter during the making of a radiograph, the operator shifts the piston 48 to the right in Fig. 3, by drawing on the piston rod 49, to a position in which a slot 62 in the piston rod 49 registers with a vertically-swinging latch 63 mounted on the cylinder head 50, in which position of the parts the latch drops into the notch 62 and holds the piston in retracted position. In thus operating the parts, in which operation the spring 52 is placed under tension, the piston 48, together with the rod 53, moves to the right in Fig. 3 without shifting the screen, or grid, until the stop 56 engages the sleeve 57 whereupon the screen, or grid, shifts with the rod 53 throughout the continued movement of this rod. The various parts being thus set, to be released by the operator when it is desired to start the screen, or grid, in motion, release is effected by the operator lifting the latch 63 whereupon the piston 48 and rod 53 shift to the left in Fig. 3, under the action of the spring 52, the screen, or grid, remaining at rest until the shoulder 55 engages the sleeve 57, whereupon the screen, or grid, shifts with the rod 53 to the left in Fig. 3, the screen, or grid, in rolling at its rollers 29 and 30 on the tracks hereinbefore described, moving in an arc-shaped path. The piston 48 in operating, as stated, acts against an air cushion in the left hand end of the cylinder in Fig. 3, the valve 47, controlling the vent opening 46 in this end of the cylinder, controlling the speed at which the parts referred to return to normal position under the action of the spring 52. As the initial movement of the piston 48 in operating as stated is relatively rapid, the spaced abutment means 55 and 56 cooperating with the collar 57 are provided, whereby the screen, or grid, is not started into operation until the air cushion in the cylinder is caused to operate to retard the movement of the piston 48.

The apparatus is also shown as provided with means for steadying the movement of the screen, or grid, to prevent jerking thereof, these means comprising a spring brake device represented at 64, carried by the cross-member 39 and extending into frictional contact with the upper surface of a curved plate 65 projecting from an end member of the frame 26.

The screen, or grid, is held against vertical displacement on the tracks engaged by the rollers 29 and 30, by means of rollers 66 and 67 journaled respectively on brackets 68 and 69 secured to the cross-members 39 and 38, these rollers engaging the upper surfaces of the curved plate 65 and a similar curved plate 70, respectively, the latter being connected with the end cross-member of the frame 26 opposite that to which the plate 65 is connected.

The apparatus shown, and adapted for radiographic work as hereinbefore explained, also comprises means for supporting an X-ray tube in position above the table top and adapting it to be moved along the latter and providing other movements of the tube desirable for the production of radiographs under the various conditions presented in practice. The tube-supporting mechanism just referred to is shown as formed of an upright tubular member 71 and tube-holding mechanism represented at 72 which engages the member 71 and has movement vertically thereon, the mechanism 72 being controlled by counterweight mechanism on the upright 71 the cable of which, represented at 73, connects with the mechanism 72 and with a counterweight (not shown) vertically movable in the upright 71, the mechanism 72, which supports an X-ray tube, represented at 74, providing for movement of this tube crosswise of the table, and also for a variety of rocking movements. The tube-supporting mechanism referred to, as shown, is of the same general construction shown and described in United States Letters Patent No. 1,239,145 granted to me September 4, 1917 and detail description of this mechanism is therefore not necessary.

The column member 71 is supported, to be movable along the table, on a track 75 which is secured to, and extends lengthwise of, the supporting framework of the apparatus, the column 71, to this end, being provided with peripherally grooved rollers 76 horizontally spaced apart, one only thereof being shown, at which the column bears upon the track. The column 71 is also provided with rollers 77 and 78 journaled on a bracket 79 extending laterally from the upright 71, and located at opposite sides of a track 80 secured to, and extending lengthwise of, the adjacent side frame member 15.

Provision is made in the particular apparatus shown, for the movement of the carriage 19 and the upright 71 lengthwise of the table, either simultaneously, or independently of each other, at will, the means shown for this purpose comprising a fork member 81 slotted at one end as indicated at 82 to receive screws 83 which screw upwardly into the plate 20, against the lower face of which the fork member 81 extends, its outer, forked, end 84 being adapted to straddle the upright 71, in one position of adjustment of the member 81, to insure simultaneous movement of the carriage 19 and upright 71. The parts are so arranged that when the screws 83 are loosened, the forked member 81 may be shifted to a position in which it does not engage the upright 71, and when the parts are in this position the upright 71 is free to be shifted lengthwise of the table structure, without shifting the carriage 19, this feature of the construction adapting the apparatus for the making of radiographs, without the use of the screen, or grid, and the adjustment of the X-ray tube to any desired position along the table, in which case the supplemental table top hereinafter more particularly referred to, is used.

In the construction shown I also provide a compression and immobilizing device for the purpose of exerting against the portions of the patient to be radiographed, the desired force for compressing such portions, when desired, for a purpose well known in the art, and maintaining, against displacement, such portions in compressed condition, the means shown for this purpose comprising a flexible band 85 secured at one end to a rod 86 mounted at its ends in brackets 87, one only of which is shown and connected together by a plate 88, this plate being provided, as more particularly shown and described of the band tauting device hereinafter described, with a pair of laterally-projecting pins adapted to extend into openings provided in a horizontal series in the adjacent side bar 16, whereby the securing device for this end of the band 85 may be positioned at any one of a number of points, as desired, along the table structure. The other end of the band 85 co-operates with a tauting means, these means, as shown, comprising the following mechanism: A roller 89, to which one end of the band 85 is connected and about which the latter winds, is journaled at its reduced ends in ears 90 projecting laterally from a plate 91 equipped with pins 92 adapted to be positioned in any of the openings 93 of a series thereof contained in the adjacent frame bar 16, whereby this roller structure is adapted to be positioned, as stated of the part to which the other end of the band 85 is connected, at any desired point along the table structure, the plate 91 being shown as provided with short pins 94 adapted to bear against the side of the adjacent bar 16. The roller 89 is formed at one end with an annular ratchet 95 which co-operates with a pawl 96 mounted to slide in a lever 97 pivoted on one of the reduced ends of the rollers 89, a spring 98, carried by the lever 97 and engaging the pawl, operating to yieldingly force the latter to the left in Fig. 6 into position for engaging the teeth of the ratchet 95. The teeth of the ratchet and the pawl are so formed that in the movement of the lever 97 in clockwise direction in Fig. 7, the roller 89 is rotated in a direction to wind the band 85 thereon, drawing it to taut condition across the patient, in which position it is retained by the pawl 96 engaging the ratchet, the pawl 96, when the lever is reversely operated, riding idly over the teeth of the ratchet 95. The apparatus, as shown, is designed to be operated to render the band 85 in taut condition, by oscillating the lever 97 on its support, and to restrain the roller 89 against retrograde rotation I provide a holding pawl 99 which cooperates with the teeth of the ratchet 95. The pawl 99, which is provided with a stem 100 of reduced diameter, is slidably mounted in a fin 101 projecting upwardly and outwardly from the adjacent one of the ears 90 and also in the body portion of the latter, a coiled spring 102 which surrounds the reduced portion 100 of the pawl and is confined between the annular shoulder 103 thereon and the body portion of the ear just referred to, serving to yieldingly force this pawl toward the ratchet. The outer end portion of the pawl 99 is slidable in a member 104 having an upwardly-extending angular portion 105, the extremity of which is tapered, as represented at 106, the pawl 99 beyond the member 104 being provided with a nut 107 thereon and forming a stop. The lever 97 is provided with an upwardly-extending finger 108 so positioned that when the lever 97 is turned on its support to a position in which it extends substantially vertically, it will engage with the tapered surface 106 of the member 104 and force the latter, together with the pawl 99, to the right in Fig. 6 to withdraw this pawl from the plane in which the teeth of the ratchet 95 extend. The fin 101 terminates at its upper edge in a plate-like portion 109 presenting an obliquely-disposed edge 110 so positioned that in the movement of the lever 97 to upright position, the spring 98 will engage the surface 110 and be cammed thereby to the right in Fig. 6, with the result of withdrawing the pawl 96 from the plane occupied by the teeth of the ratchet 95. The withdrawal of the pawls 96 and 99, as stated, occurs practically simultaneously and when so withdrawn from engagement with the teeth of the ratchet 95, the band 85 may be slackened as desired, as the roller 89 then runs free.

It is oftentimes desirable that radiographs be made upon sensitized plates laid upon the table top directly beneath the patient, in which case the use of the screen, or grid, is dispensed with. My improved apparatus is adapted for the making of radiographs as stated, and to this end I provide a substantially flat table top, represented at 111. In the particular form shown, this supplemental table-top is provided of such shape and proportions that it may be seated upon the upper portions of the rail 16 and interengage therewith, by virtue of the depending portions provided about its marginal edges, as shown more particularly in Fig. 2 wherein this supplemental table top is shown by dotted lines, this table top being shown as a structure which may be entirely removed from the other parts of the table structure when use thereof is not desired. When positioned as shown and stated it adapts a plate to be laid upon it to underlie the patient supported by the table top 111. It is in connection with the supplemental table top that the feature of releasably connecting together the carriage 19 and the upright 71, is of advantage, as the operator, when these parts are disconnected, may shift the upright 71 along the table structure to position it as desired without moving the carriage 19.

It will be noted that the compression device of which the band 85 is a part, may also be used in connection with the supplemental table top 111, when desired.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In X-ray apparatus, the combination of a suitable supported trough-shaped support for a patient, and a screen, of substantially concavo-convex form with partitions to screen off secondary and scattered X-rays, located beneath, and substantially concentric with, said support and movable lengthwise of the latter.

2. In X-ray apparatus, the combination of a suitably supported trough-shaped support for a patient, and a screen, of substantially concavo-convex form with partitions to screen off secondary and scattered X-rays, located beneath, and substantially concentric with, said support and movable lengthwise of the latter, said screen, also being movable in a curved path crosswise of said support.

3. In X-ray apparatus, the combination of a support for a patient, a screen, with partitions to screen off secondary and scattered X-rays, engaging said support and movable thereon lengthwise of the latter, and a compression and immobilizing device extending across said support and shiftable into different positions lengthwise of said support independently of the adjustment of said screen.

4. X-ray apparatus comprising a trough shaped support for a patient, a standard for an X-ray tube movable lengthwise of said support, a screen with partitions to screen off secondary and scattered X-rays engaging said support and releasably secured to said standard, said screen also being movable lengthwise of the support, and an auxiliary support top adapted to support an X-ray cassette and a patient, said top having portions adapted to engage complemental parts on said trough shaped support whereby to facilitate the registration of said top with said trough shaped support, said auxiliary top being adapted to convert the apparatus from a device for producing radiographs with a screen to one for making simple radiographs.

5. In X-ray apparatus, the combination of a suitably mounted support for a patient, and a screen with partitions to screen off secondary and scattered X-rays located beneath and movable transversely and lengthwise of said support.

6. In X-ray apparatus, the combination of a suitably mounted support for a patient, and a screen with partitions to screen off secondary and scattered X-rays located beneath and movable transversely and lengthwise of and in parallelism with said support.

7. In X-ray apparatus, the combination of a suitably mounted support for a patient, and a screen with partitions to screen off secondary and scattered X-rays, and means for mounting said screen beneath and in substantial parallelism with said support to be moved lengthwise and crosswise of said support.

8. In X-ray apparatus, the combination of a suitably mounted support for a patient, a screen with partitions to screen off secondary and scattered X-rays located beneath and in substantial parallelism with said support, and means for moving said screen lengthwise and crosswise of said support while maintaining such parallelism.

9. X-ray apparatus comprising a trough-shaped table of support for a patient, an X-ray tube movable relatively of said support, and an auxiliary support top adapted to support a casette and a patient, said top having portions adapted to engage complemental parts on said trough-shaped support whereby to facilitate the registration of said top with said trough shaped support.

JULIUS B. WANTZ.